Dec. 7, 1965  J. H. FORKNER  3,221,675
METHOD OF MANUFACTURING A FOOD PRODUCT
Filed March 7, 1962  3 Sheets-Sheet 1

INVENTOR.
JOHN H. FORKNER.
BY
ATTORNEYS

Dec. 7, 1965  J. H. FORKNER  3,221,675
METHOD OF MANUFACTURING A FOOD PRODUCT
Filed March 7, 1962  3 Sheets-Sheet 2

*INVENTOR*
JOHN H. FORKNER
BY
ATTORNEYS

Dec. 7, 1965  J. H. FORKNER  3,221,675
METHOD OF MANUFACTURING A FOOD PRODUCT
Filed March 7, 1962  3 Sheets-Sheet 3
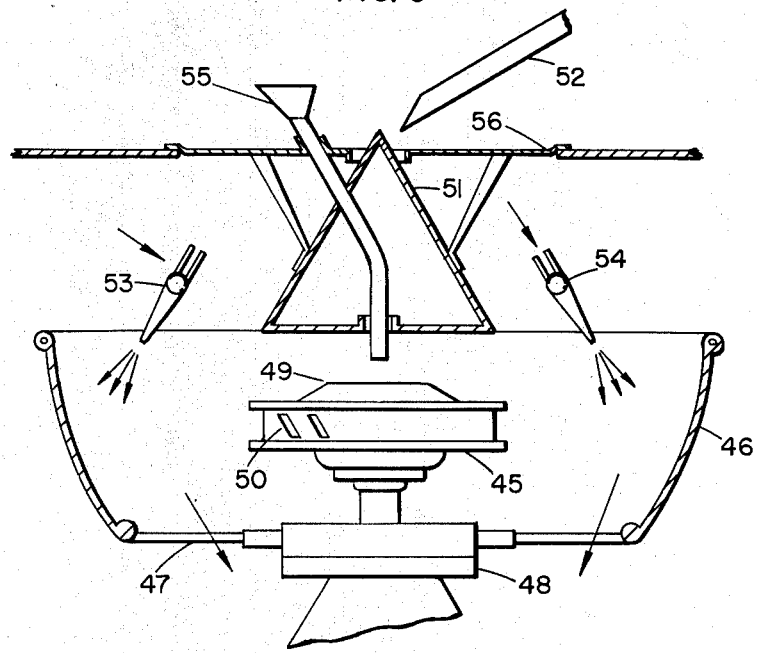
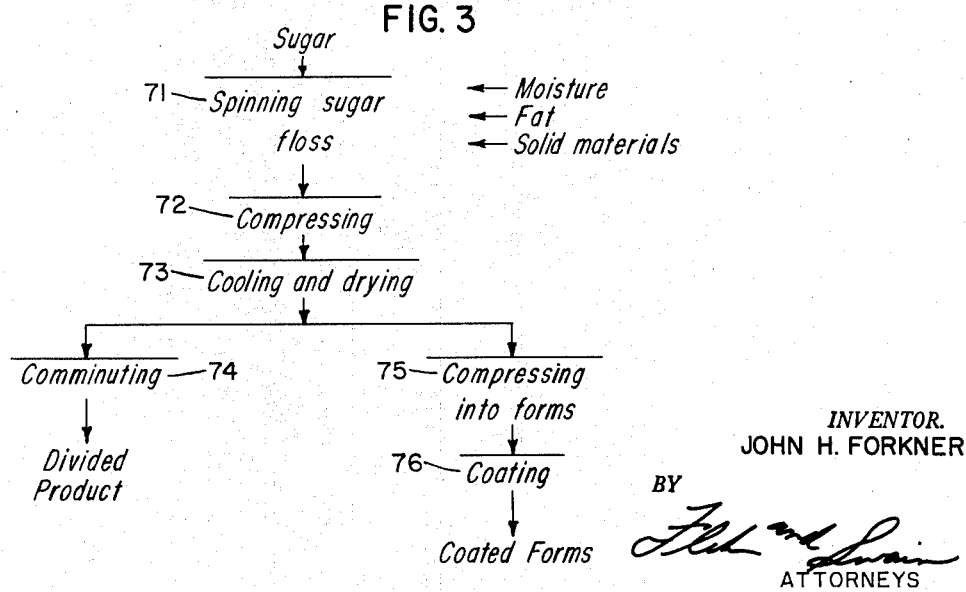
INVENTOR.
JOHN H. FORKNER
BY
ATTORNEYS United States Patent Office 3,221,675
Patented Dec. 7, 1965

3,221,675
METHOD OF MANUFACTURING A FOOD PRODUCT
John Hood Forkner, Fresno, Calif., assignor to The Pillsbury Company, Minneapolis, Minn., a corporation of Delaware
Filed Mar. 7, 1962, Ser. No. 178,040
5 Claims. (Cl. 107—54)

This invention relates generally to sugar and sugar-containing food products, such as special forms of sugar and various confections. Also it pertains to methods and apparatus for manufacturing such products.

So-called cotton candy is produced by spinning thread-like filaments of melted sugar (e.g., sucrose) from a centrifugal head. An example of a machine for this purpose is shown in Patent 1,489,342. In the past, such sugar floss products have been in the category of candy specialties that are sold directly to the consumer as produced. There has been little variety with respect to the products produced, because flavors and colors are limited to those that can be incorporated in sugar as solid constituents, without interfering with operation and maintenance of the floss machine. Such flavors and colors must have relatively good stability at high temperatures. For example, soluble flavors that are volatile in character are not practical because the elevated temperatures employed to melt the sugar cause excessive loss of the volatile constituents. In addition to the foregoing, ordinary sugar floss is highly wettable and dissolves rapidly on contact with water. Also it is highly hygroscopic.

The subject invention is based upon my discovery that a wide variety of new products can be made by the utilization of sugar floss. Such new products are characterized by a relatively high bulk volume, and by a predetermined wettability that may vary over a wide range as desired, but which differs substantially from ordinary sugar floss. I have found that a wide variety of flavors and edible constituents can be incorporated in such products.

In general it is an object of the present invention to provide novel sugar-containing food products that are characterized by the presence of sugar filaments or portions thereof.

Another object of the invention is to provide novel food products of the above character having predetermined wettability that is substantially less than ordinary sugar floss.

Another object of the invention is to provide novel food products containing sugar filaments or portions thereof together with non-filamentary solid material.

Another object of the invention is to provide novel sugar containing products that can be readily incorporated with a wide variety of aqueous food mixes, whereby novel characteristics are imparted to the end products.

Another object of the invention is to provide novel food products in the form of free-flowing divided materials having relatively low bulk density and inhibited wettability, with each fragment or particle of the mass containing some sugar in the form of filaments or portions thereof.

Another object of the invention is to provide a novel method for manufacturing my product.

Another object of the invention is to provide a novel machine or apparatus for carrying out the present method.

Additional objects and features of the invention will appear from the following description in which the preferred embodiments have been set forth in detail in conjunction with the accompanying drawings.

Referring to the drawings:

FIGURE 3 is a flow sheet illustrating another procedure in which one or more non-filamentary solid materials are employed.

FIGURE 5 is a view like FIGURE 4, but showing another embodiment of the apparatus.

As previously indicated, my invention makes possible the manufacture of a wide variety of food products, having a wide variety of characteristics, but which are all characterized by the presence of sugar filaments or portions thereof.

Figure 4:
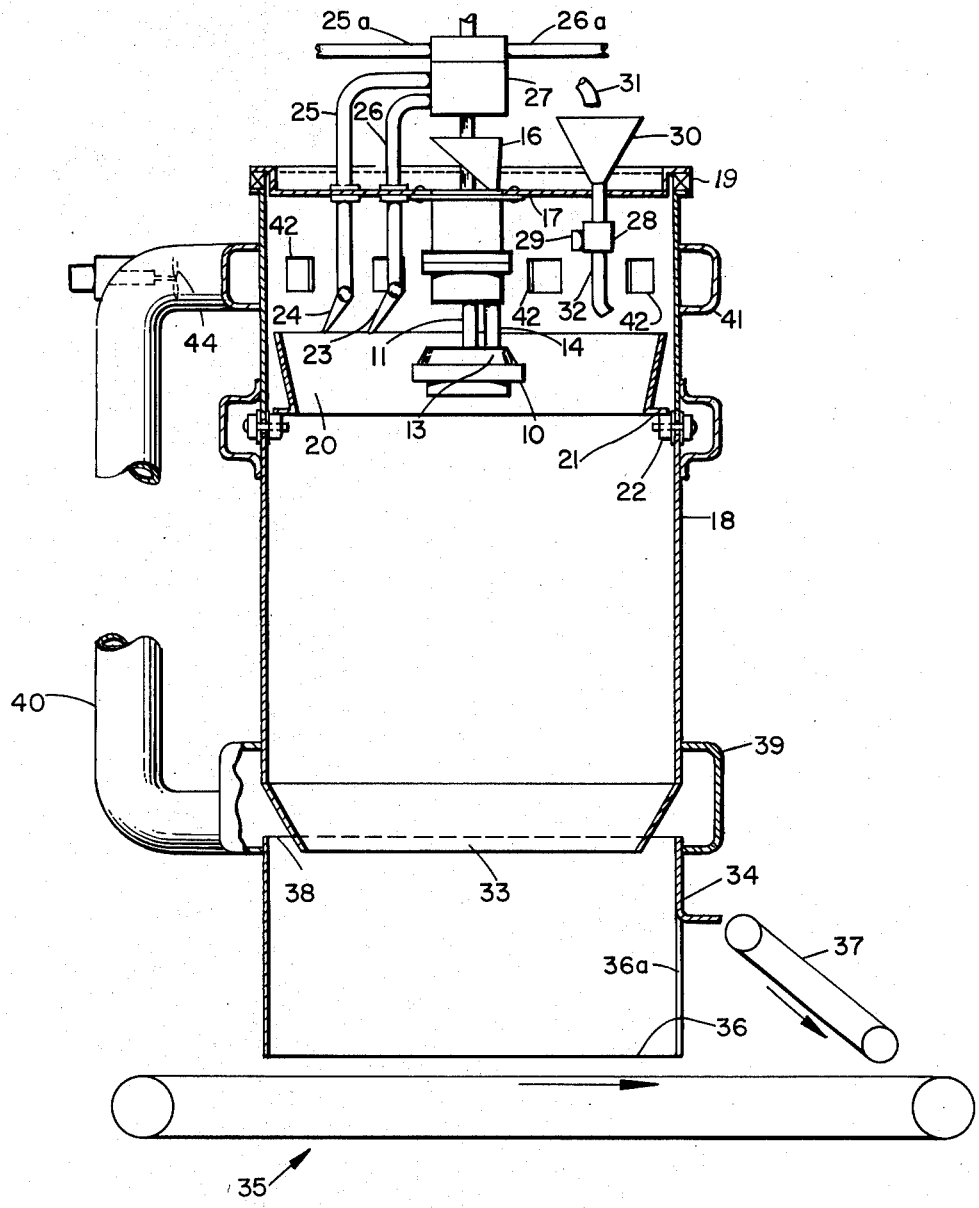
FIGURE 4 is a schematic view in side elevation illustrating one type of apparatus suitable for carrying out the present method.

The machine illustrated in FIGURE 4 is suitable for carrying out all of the procedures herein described. It consists of a rotary spinning head 10 mounted upon a rotary shaft 11 which is driven by suitable means (not shown), such as an electric motor. The rotary head may be constructed in accordance with the various floss machines now available on the market, or in accordance with the disclosure of the Brent Patent No. 1,489,342. In general, it has an upper annular portion 13 into which a quantity of sugar can be introduced, either in batches or continuously. Also it has peripheral openings (not shown), from which the thread-like filaments of melted sugar are spun. Electrical heating means (not shown) is incorporated in the head to progressively melt the sugar, as is well known to those familiar with such machines. The current supply wires for the electrical elements may extend through the shaft 11. Feed pipe 14, which connects with the exterior hopper 16, serves to introduce sugar into the head 10.

The head is shown being supported by the top wall 17, of the chamber 18. The chamber preferably is circular in section as illustrated, and forms a vertical tower, the upper portion of which contains the head 10. Preferably, the top wall (and parts carried by the same) is rotatable and thus it is shown carried by bearing means 19, and is connected to controllable drive means (not shown).

Surrounding the head 10 there is an annular collecting member or bowl 20, upon which the sugar filaments are deposited as they are spun outwardly from the head. Preferably this member is rotatable about the vertical axis of the machine, and for this purpose it is shown provided with an annular rib 21, which is supported by the flanged rollers 22. One or more of these rollers is connected with suitable driving means (not shown) whereby the member 20 can be rotated at a desired speed.

Atomizer nozzles 23 and 24 are mounted in a region above the head and the member 20, as illustrated. These atomizer heads are connected to exterior piping 25 and 26, whereby various fluid materials can be supplied and delivered to the region generally surrounding the head 10, in atomized form. These heads may be of the high pressure type, or of the type utilizing pneumatic pressure for atomization. They may be directed as desired for optimum application of the droplets. Pipes 25 and 26 may connect with stationary supply pipes 25a and 26a, through the control manifolding means 27.

The machine may in some instances incorporate suitable means for introducing divided solid materials into the region generally surrounding the head 10. For this purpose, I have shown a powder sifter 28, which is associated with a vibrator 29 or like means to obtain a controlled rate of powder feed. Sifter 28 connects with the external hopper 30, which may be supplied with powder from the rotatable swing conduit 31. Pipe 32 delivers the powder into a region in front of the member 20.

The lower open end 33 of the chamber 18 extends into the open ended boot 34 having bottom opening 36 and side opening 36a, the lower end of which immediately overlies the upper run of the endless belt conveyer 35. This conveyer belt is driven by suitable means (not shown) whereby cotton candy or floss falling upon the same is removed through side opening 36a for further processing. Because the floss at this time has a relatively high volume, the bottom opening 36 and side opening 36a for its egress are relatively large. A second endless belt conveyer 37 is shown overlying the conveyer 35, and is inclined whereby it acts upon the material being removed from the machine to compress the mass to reduce its volume and to effect increased points of contact and attachment between the filaments.

To minimize loss of atomized material introduced by way of the atomizing heads 23 and 24, it is desirable to provide means for withdrawing atomized droplets leaving the lower opening 33, and for returning them back into the upper part of the chamber 18. For this purpose the annular space 38 between the lower end of chamber 18 and the upper end of the boot 34, communicates with the manifold 39, and this manifold in turn connects with the conduit 40. The upper end of this conduit connects with a manifold 41, which communicates with the interior of the chamber through the circumferentially spaced openings 42. Suitable means such as a blower or fan 44 is shown for circulating air through the conduit 40.

Without particularizing upon the various procedures which can be used in connection with the apparatus of FIG. 4, the general operation of the machine can be described as follows: When in operation, sugar filaments are spun from the rotating head 10 and are delivered upon the annular member 20. From this member, cotton-like masses of filaments fall down (or are removed by suitable scraper blades not shown) through the column of air within chamber 18, and come to rest upon the upper run of conveyer 35. Atomized fluid droplets from one or both of the atomizer heads 23 and 24 commingle with the sugar filaments, as they are progressing outwardly from the head 10 and are deposited upon the annular member 20, and also such droplets may form vapors within the chamber 18 below member 20, whereby some further depositing of droplets and vapor occurs as the filamentary material falls downwardly to the lower open end 33. A substantial part of such atomized droplets find their way into the manifold 39 and are returned by way of conduit 40. Solid divided material introduced by way of hopper 30 and pipe 32 is dropped downwardly into the region in front of member 20. Such solid material moves outwardly to be deposited together with the sugar filaments, with the solid material becoming mechanically attached to the sugar filaments both by enmeshment and by adherence. Some additional solid material which may find its way into that portion of the chamber below member 20, is brought into random contact with the sugar filaments, and thereby caused to be mechanically attached to the sticky surfaces of the filaments.

Generally it is desirable to rotate both the top 17 with its associated atomizers and powder feeder, and the member 20, whereby the materials being added to the filaments are well distributed in a desired sequence.

The simplified machine illustrated in FIGURE 5 consists of a rotary spinning head 45 mounted upon the shaft of a suitable electric motor (not shown), together with a bowl-shaped collector or receiver 46. The receiver may be carried by a spider 47 and journalled at 48 to permit rotation about its vertical axis. The rotary head 45 may be constructed in accordance with the various floss machines now available on the market, or in accordance with the disclosure of Brent Patent No. 1,489,342.

It has an upper central opening 49 through which a quantity of sugar can be introduced, together with peripheral openings 50 through which the thread-like filaments of melted sugar are discharged. The means for feeding a divided solid material into the annular region surrounding the rotary head 45, consists of a stationary cone 51, which is mounted immediately above and in alignment with the rotary head 45. Suitable means such as a conveyer 52 of the vibrating type, serves to deliver solid material upon the apex of the cone 51, whereby such material travels down along the sides of the cone to be discharged into the annular region surrounding the rotary head. Suitable means (not shown) can be attached to the cone for continuously vibrating it when the machine is in operation.

Suitable spray devices 53 and 54 are provided for introducing atomized sprays of various fluid additives. These devices can be mounted by suitable means (not shown) and are directed to cause the atomized droplets to be deposited upon the candy floss being thrown outwardly and being built up on the inner surfaces of the bowl 46. A feed tube 55 is provided for introducing raw granulated or powdered sugar into the head 45. The cone and associated parts are shown carried by a removable cover 56.

Figure 1:
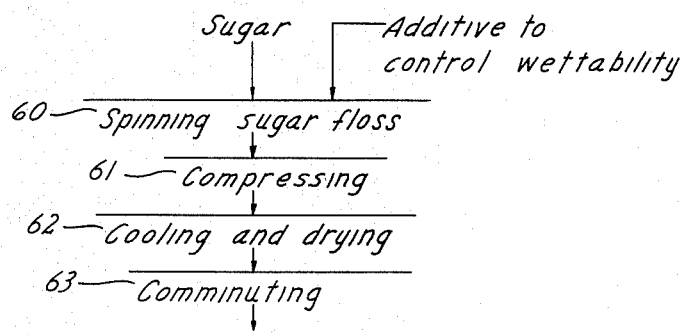
FIGURE 1 is a simplified flow diagram illustrating one procedure for manufacturing a product in accordance with the present invention.
Figure 2:
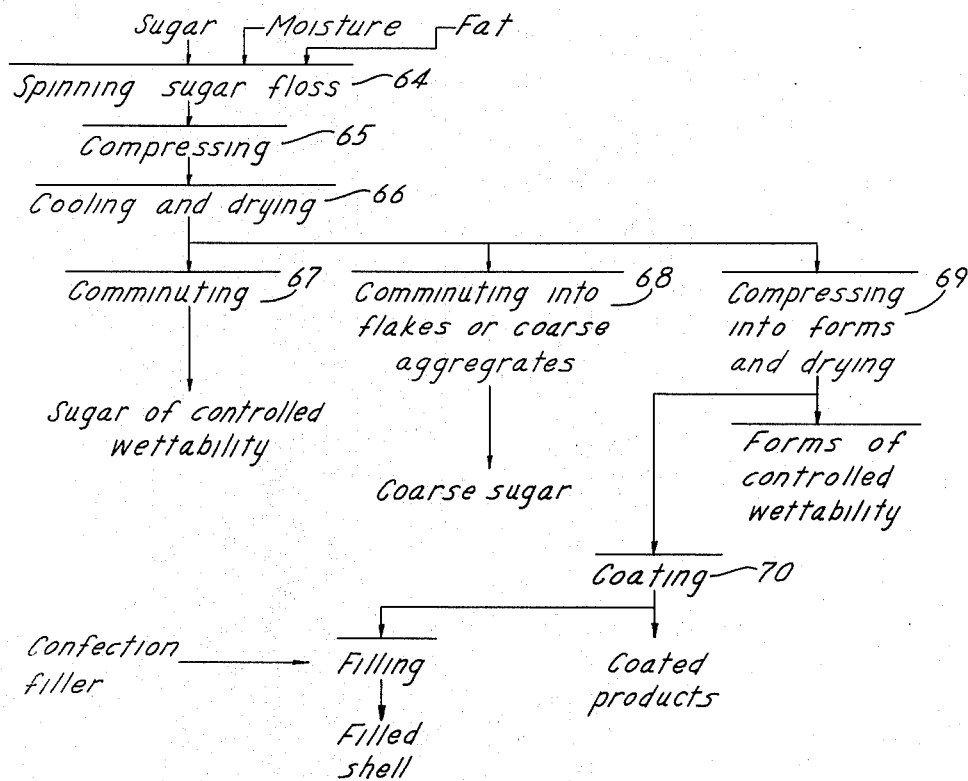
FIGURE 2 is a flow sheet illustrating another procedure for carrying out the invention.

Referring now to the various flow sheets comprising FIGURES 1–3, inclusive, in FIGURE 1, I have shown a general procedure for the manufacture of an edible food product. In this instance a suitable sugar, such as powdered or granulated sucrose, is supplied to the spinning step 60, where it is spun and deposited in the form of thread-like sugar filaments. In conjunction with the spinning operation, an additive is applied to coat the warm sugar filaments being deposited. The cotton-like material with the additive, while warm (e.g., 120 to 180° F.) is subjected to a pressing or compacting operation 61, whereby its volume is greatly reduced, and it is converted to the form of sheets, bars, strips or the like. After such sheets have set and cooled in step 62 to room temperature, they may be subjected to the comminuting operation 63, which reduces the sheets to the form of a free-flowing divided or powdered sugar material, the particle size of which is dependent upon the comminuting procedure employed. The individual particles of this sugar comprise either a plurality of filament portions that are attached together in random fashion, or single filament portions without such attachment. In instances where the additive includes a vaporizable carrier like alcohol or water, the residual moisture or carrier content of the final product can be reduced by atmospheric or vacuum drying applied in step 62 before or after comminuting.

The coating medium should be capable of reducing the wettability of the filaments or filament portions, and their rate of dissolution when contacted with water at ambient temperature, to a desired extent. Wettability may be reduced, for example, by increasing the surface tension of the filaments. Also, the coating medium can provide bonding between the filaments or portions thereof. For example, I can employ edible waxes, or wax-like materials, or blends thereof, such as carnauba or beeswax, which can be applied in aqueous solution or emulsions, or as molten atomized particles. Also I can employ normally solid fats or oils, normally solid edible fats or oils, or blends of oils and waxes. Such a coating material can be applied as an emulsion prepared by emulsifying a suitable edible fat in warm water, together with a suitable edible emulsifying agent like lecithin. Also such a normally solid fat or blend can be melted by heating and applied as molten particles, with or without separate application of atomized water. As suitable fats, reference can be made to natural vegetable oils and fats, hydrogenated vegetable or animal fats, shortening fats, or synthetic fat-like materials such as monoglycerides, or other fat-like materials. So-called high melting point fats, suitable for use for shortening and which have a melting point of the order of 120° or higher, can be used with good results. Various gums or gel forming materials (e.g., gum arabic, gum tragacanth, alginates or gelatin) can be employed in aqueous solutions or emulsions although such materials do not retard wettability or rate of dissolution to the same extent as waxes or fats.

The amount of coating material employed may vary in accordance with its character, and the properties desired in the final product. In typical instances, the coating material applied to the final product may range in amount from, say, 2 to 10% of the sugar content.

As previously mentioned, the additive or additives provide means for bonding sugar filaments together. Moisture aids in bonding by making the surfaces of the filaments somewhat sticky whereby filaments tend to adhere together where they come into contact with each other. The coating materials mentioned above also have a bonding action, particularly since they are solid at room temperature.

Although particular reference has been made to the use of sucrose in granulated or powdered form, other sugars can be employed such as are suitable for use in a floss spinning machine. For example, I can employ dried glucose, dextrose, or commercial corn sugar. Also, instead of highly refined sucrose, I can employ the less refined sugars, such as so-called brown sugar. Special coloring and flavoring can be added as desired.

My product has distinctive characteristics which differentiate it from ordinary candy floss. When ordinary candy floss is comminuted, it provides a material that is highly wettable and hygroscopic. When a quantity of such material is deposited upon the surface of water, it quickly wets and sinks, and rapidly dissolves. Likewise, when exposed to the atmosphere it quickly absorbs atmospheric moisture with resulting physical disintegration and caking. When a quantity of my product is deposited upon water, it floats for a substantial period of time dependent upon the extent wettability has been altered by the coating material. Likewise, it is substantially less hygroscopic, depending again upon the character and the amount of coating material present.

Instead of comminuting the material in step 63 to a relatively finely divided powder, the material can be subjected to disintegration to break it up into relatively coarse aggregates. This serves to produce a coarse free-flowing material, which has a somewhat lower specific density than the material produced by finer comminuting.

Although the additives referred to above serve to control and provide a predetermined amount of wettability in cold water, they do not interfere with the edibility of the product, because all such additives quickly dissolve and are removed in the digestive process.

In some instances it is desirable separately to apply moisture and a coating material like a molten wax or fat to the cotton floss. Thus, as shown in FIGURE 2, both atomized moisture and atomized melted wax or fat are being supplied to the spinning operation 64, whereby such atomized droplets are applied to the thread-like sugar filaments. For the purpose of applying the moisture and coating material in this manner, both of the atomizer heads of FIGURES 4 and 5 can be employed.

Use of both moisture and wax or fat, separately applied as described above, permits control of the moisture to impart a desired surface stickiness, and separate control of the amount of wax or fat applied to provide predetermined wettability characteristics.

The candy floss from step 64 of FIGURE 2 is shown being supplied to the compressing operation 65, and the compressed sheets or like masses are permitted to set at 66, during which time the filaments become harder and moisture better distributes itself throughout the mass. Also at this time it is desirable to subject the material to drying, by exposure to warm drying gas, or by vacuum drying.

From step 66 a part of the material is shown being supplied to the comminuting operation 67, to produce a free-flowing divided sugar of controlled wettability. Another part of the material from operation 66 is shown being supplied to the comminuting operation 68, which serves to produce a relatively coarse free-flowing sugar.

Some of the material from operation 66 is shown being diverted to the step 69, where it is compressed into forms of predetermined size and shape. After drying (e.g., to ½% moisture content or less), some such shapes can be coated with edible material at 70, such as chocolate flavored confection coating, to produce coated products. Assuming that such an exterior coating is of sufficient thickness and uniformity, a product prepared in this manner can be used for the molding of moist confections. Thus, when a warm aqueous confection filler in semi-fluid form is introduced into such a product, through a small aperture in the coating layer, it immediately dissolves the inner filaments, thus permitting the shell to be substantially filled. After filling the intrusion opening can be coated over, whereby it is not readily visible. When such a product is eaten, the sugar floss is not in evidence, because it has been substantially dissolved in the filler.

Free-flowing sugar products of controlled wettability made as described above can be used for a variety of purposes. For example, such products can be used in various dry pre-mixes (e.g., cake, icings, etc.). Also they can be used in the same manner as granulated sugar, particularly on breakfast cereals and like products. When applied to cereal with milk or cream, the product floats rather than sinks upon the surface of the milk. This is because the coating inhibits surface wetting and dissolution of the sugar. In general the rate of solution when contacted with water, is greatly extended in comparison with ordinary granulated sucrose or spun sugar.

In the method shown in FIGURE 3, solid divided materials are applied, in addition to moisture and waxes or fat. In this instance, solid materials are supplied to the spinning operation 71, as, for example, by way of the feed conduit 31 of FIGURE 4 or the chute 52 of FIGURE 5. The particular edible material used may vary widely, and may, for example, consist of materials in flake form, such as flaked chocolate or materials in granular or powdered form, such as chocolate, hard or gummy candy, cereal flour, dry milk solids, powdered yeast, spices or the like. When supplied to the region surrounding the spinning head, such divided materials are caused to be deposited with the sugar filaments and as a result they are mechanically intermeshed in the mass of cotton candy. An aqueous material such as atomized water can be supplied as indicated to provide better bonding between the filaments. A coating material is supplied to control wettability, as, for example, atomized melted wax or fat. In general, it is desirable to apply the atomized water and wax or fat in advance of the application of divided solid material. The composite material from step 71 is supplied to the compressing step 72, followed by setting and drying at 73, to form a mass which is supplied to the comminuting operation 74. The resulting divided product is a dry free-flowing material having predetermined controlled wettability.

A part of the material from step 73 can be subjected to the compressing step 75 to compress it into forms of predetermined size and shape. Such material can be coated at 76 to provide coated forms.

Instead of or in addition to supplying solids in divided form, some solids can be dispersed in a liquid medium, such as the water being atomized and applied as droplets to the sugar floss. For example, when whole or skim milk with or without previous concentration is applied instead of atomized water, the solids of the milk appear in the final product. Other materials can be dissolved or dispersed in the water, such as chocolate and the like.

Assuming that the method of FIGURE 3 is carried out to produce compressed forms, such forms may serve to contain fragile solids of substantial size, such as thin chocolate flakes supplied in the spinning step 71. The filaments surround the flakes and protect them from injury. Compressed forms of this character can be used to disperse such fragile solids in another end product. Assuming that such forms are coated, then such coated products can be used in a shell molding method, as previously described.

Previous reference has been made to the use of less refined products than granulated sugar. In one instance the invention was used to advantage to convert a sugar having a substantial molasses content (e.g., raw cane sugar which of itself is difficult to make and package as a free-flowing divided material) into a free-flowing material that is relatively nonhygroscopic and stable. Thus the raw sugar is spun into filaments, and an additive applied to reduce wettability, such as a normally solid wax or fat. Thereafter the cotton candy is compressed, the compressed mass permitted to set and dry, and then comminuted to form a free-flowing dried material. This product is relatively stable when exposed to the atmosphere, and does not have the sticky characteristic of other molasses products. The molasses content is homogeneously dispersed in the product and is retained within the coated filaments.

It will be evident that the products made by the various procedures described above have many commercial applications. Particularly, new sugar products are provided which can be used in place of other free-flowing sugars, but which have the property of predetermined wettability. When in compressed forms, the filaments may serve to retain or suspend fragile flakes or other solid low moisture content fragments, thus protecting such fragments from disintegration during packaging, storage and marketing.

My free-flowing sugars may be used as a packaging material for various materials, such as dehydrated foods. Thus, dehydrated foods like shrimp can be packed in cartons with the sugar product, whereby the sugar maintains the articles separated and out of contact with the walls of the carton. Upon removing the shrimp, only a minimum amount of sugar adheres to their surfaces.

Where compressed forms are coated they may serve to permit the shell molding of other materials, such as semi-fluid confection fillers, and the like.

Examples of my invention are as follows:

*Example 1*

Refined granulated sucrose was applied to the spinning head of a machine substantially in accordance with FIGURE 4. Moisture was applied as warm atomized water to the sugar filaments being collected in the bowl 46. The water contained about 2% of gum arabic. After removal from the bowl 46, the material was compressed to about ⅛ its original volume. It was permitted to set for about two hours, and was subjected to drying air to produce a final moisture content of less than about 1%. This material was then fed to a hammer mill and reduced to a free-flowing powder, having a specific density of about 8 ounces per liter. The individual particles of this free-flowing product, when examined under a microscope, were formed in some instances by filament portions bonded together in random fashion, and in part by individual filament portions. There was a complete absence of the normal crystal-like form of granulated sugar particles. When a quantity of this material was deposited upon the surface of water, it floated for a substantial period of time, before sinking.

*Example 2*

The same general procedure was followed as in Example 1, but without comminuting. A quantity of the compressed material after setting was applied to a die-forming machine where it was compressed into forms simulating slices of oranges. Thereafter it was dried to a moisture content of about ½%. These forms were then coated with chocolate.

*Example 3*

Forms produced in accordance with Example 2 were used for shell molding. A small aperture was made in the chocolate coating shell, and a warm semi-fluid confection filler introduced into the interior. As the hydrous filler was introduced into the shell, it contacted and dissolved the interior sugar filaments, and thus took the place of the space previously occupied by the filaments. After cooling the aperture was coated over with chocolate. The final product was a confection consisting of a confection filler within a chocolate shell.

*Example 4*

Unrefined granulated sugar (sucrose) was supplied to the spinning head, and as the spun filaments were being collected, they were subjected to an atomized spray of molten beeswax whereby the filaments were provided with a solidified wax coating film. The amount of beeswax thus added to the final product was of the order of 2.0%. It was made fluid for spraying by heating to 300° F. The temperature of the atmosphere into which the beeswax was sprayed was about 100° F. The resulting cotton candy floss was compressed to about ⅛ of its original volume. The compressed sheets were then permitted to set and cool. Thereafter the sheets were comminuted in a hammer mill to produce a free-flowing sugar. Under microscopic analysis, the particles of this sugar comprised in some instances filament fragments bonded together in random fashion, and in some instances individual filament fragments. The specific density was of the order of 13 ounces per liter. This sugar likewise had controlled wettability. When deposited upon the surface of cold water, it floated and resisted wetting over periods in excess of 5 minutes. Also it was nonhygroscopic with respect to atmospheric moisture. In general it was substantially less wettable and more resistant to dissolution than the product of Example 1.

*Example 5*

Refined granulated sugar (sucrose) was supplied to the spinning head, and simultaneously a melted fat atomized into the region surrounding the head. The particular fat employed was Durke's Aratex in proportions corresponding to 5% of the sugar in the final product. The fat was applied at a temperature of 150° F. The resulting cotton candy was compressed to about ⅛ its spun volume and the resulting sheets comminuted in a hammer mill to produce a free-flowing sugar. Under a microscope the particles were of the same character as described in Example 1. The specific density was of the order of 7 ounce grams per liter. This product had properties comparable to the product of Example 4. It had restricted wettability and when deposited on the surface of cold water or other aqueous liquids, it floated and resisted wetting over periods in excess of 60 minutes. Also it was relatively nonhygroscopic with respect to atmospheric moisture. It had good palatability and a pleasing flavor.

*Example 6*

The same procedure was followed as described in Example 5. Instead of utilizing a fat, an aqueous solution was prepared consisting of 4% edible gelatin. This solution was atomized and applied in the same general manner as described in Example 1. The cotton candy produced was compressed to about ⅛ its original volume and after setting and being subjected to drying and cooling, it was passed through a hammer mill and comminuted to form a free-flowing sugar.

*Example 7*

A quantity of spun sugar prepared in accordance with Example 4 was used as a packaging material. Thus a layer of the sugar about ¼ inch deep was placed over the bottom of a moisture-proof carton, and then articles of a dehydrated food product, namely, dehydrated shrimp, were placed upon the layer of sugar, taking care to space the shrimp apart. Thereafter sufficient sugar was introduced to fill the spaces between the shrimp, and to provide an overlying layer. The carton was then closed to provide a package wherein the sugar maintained the shrimp masses from contact with each other and with the side walls of the carton, and in general to hold the masses in predetermined positions during handling. Upon opening the carton the shrimp were removed with only a minimum amount of sugar adhering to the surfaces.

I claim:

1. In a method for the manufacture of a sugar-containing food product, the steps of forming a mass of sugar filaments by centrifugally spinning the filaments and then causing the same to move in free flight and to be deposited upon each other to form a cotton-like mass, simultaneously applying to the spun filaments sufficient moisture to render the surfaces of the filaments sticky, and then compressing the mass to reduce its bulk volume and to cause the sticky filaments to adhere together at points thereby brought into contact.

2. In a method for the manufacture of a sugar-containing food product, the steps of forming a mass of sugar filaments by centrifugally spinning the filaments and then causing the same to move in free flight and to be deposited upon each other to form a cotton-like mass, simultaneously applying a bonding material in fluid condition to the spun filaments, and thereafter compressing the cotton-like mass to reduce its bulk volume.

3. In a method for the manufacture of a sugar-containing food product, the steps of forming a mass of sugar filaments by centrifugally spinning the filaments and then causing the same to move in free flight and to be deposited upon each other to form a cotton-like mass, simultaneously applying moisture and a wettability inhibiting material to the surfaces of the filaments, and then compressing the cotton-like mass.

4. In a method for the manufacture of a sugar-containing food product, the steps of forming a mass of sugar filaments by centrifugally spinning the filaments and then causing the same to move in free flight and to be deposited upon each other to form a cotton-like mass, compressing the cotton-like mass to reduce its volume and to effect increased points of contact and attachment between the filaments, and then comminuting the compressed mass to form a free-flowing material.

5. In a method for the manufacture of a sugar-containing food product, the steps of forming a mass of sugar filaments by centrifugally spining the filaments and then causing the same to move in free flight and to be deposited upon each other to form a cotton-like, warm filamentary mass and then compressing the warm filamentary mass to reduce its volume to a minor fraction of its original volume and to effect increased points of contact and attachment between the filaments.

References Cited by the Examiner

UNITED STATES PATENTS

| | | | |
|---|---|---|---|
| 717,756 | 1/1903 | Morrison et al. | 107—8.7 |
| 816,056 | 3/1906 | Zoeller | 107—54 |
| 1,489,342 | 4/1924 | Brent | 107—8 |
| 2,160,730 | 5/1939 | Hackett | 99—138 |
| 2,175,214 | 10/1939 | Robinson et al. | 99—138 |
| 2,198,152 | 4/1940 | Cooley et al. | 107—8.7 X |
| 2,648,297 | 8/1953 | Cloud | 107—14 X |
| 2,879,163 | 3/1959 | Anson et al. | 107—54 X |
| 3,009,427 | 11/1961 | Bell | 107—54 |
| 3,036,532 | 5/1962 | Bowe | 107—8 |

WALTER A. SCHEEL, *Primary Examiner.*

B. H. STRIZAK, CHARLES A. WILLMUTH, WILLIAM B. PENN, ROBERT E. PULFREY, *Examiners.*